United States Patent [19]

Hall

[11] Patent Number: 5,187,868
[45] Date of Patent: Feb. 23, 1993

[54] METAL DEMOLITION SHEAR

[76] Inventor: Charlie R. Hall, P.O. Box 190, Wadley, Ga. 30477

[21] Appl. No.: 899,253

[22] Filed: Jun. 16, 1992

[51] Int. Cl.⁵ .................. B25F 3/00; B26B 15/00; A01D 55/00
[52] U.S. Cl. ................................. 30/134; 30/228; 241/101.7
[58] Field of Search .............. 30/92, 134, 228; 144/34 E; 414/740; 241/101.7

[56] References Cited

U.S. PATENT DOCUMENTS

| | | | |
|---|---|---|---|
| 4,104,792 | 8/1978 | LaBounty | 30/134 |
| 4,188,721 | 2/1980 | Ramun et al. | 30/134 |
| 4,198,747 | 4/1980 | LaBounty | 30/134 |
| 4,376,340 | 3/1983 | Ramun et al. | 30/134 |
| 4,382,625 | 5/1983 | LaBounty | 294/104 |
| 4,403,431 | 9/1983 | Ramun et al. | 37/117 |
| 4,519,135 | 5/1985 | LaBounty | 30/134 |
| 4,543,719 | 10/1985 | Pardoe | 30/134 |
| 4,558,515 | 12/1985 | LaBounty | 30/134 |
| 4,616,417 | 10/1986 | Gross | 30/134 |
| 4,670,983 | 6/1987 | Ramun et al. | 30/134 |
| 4,686,767 | 8/1987 | Ramun et al. | 30/134 |
| 4,771,540 | 9/1988 | LaBounty | 30/134 |
| 4,776,093 | 10/1988 | Ramun et al. | 30/134 |
| 4,872,264 | 10/1989 | LaBounty | 30/210 |
| 4,897,921 | 2/1990 | Ramun | 30/134 |
| 4,951,886 | 8/1990 | Berto | 241/101.7 |

Primary Examiner—Douglas D. Watts
Assistant Examiner—Paul M. Heyrana, Sr.
Attorney, Agent, or Firm—James A. Hinkle

[57] ABSTRACT

A metal demolition shear has a pivotal axle (4) with threading means (34, 35, 48, 42, 90, 92, 104) at opposite ends for adjusting linear positioning of thrust bearings (25, 26, 55, 56, 64) in order to adjust closeness of a pivotal jaw (1) to a stationary cutter jaw (2) of a demolition shear. A bolt-on replaceable cutter tip (14) is positional on a distal end of the pivotal jaw (1) in slidable contact with an adjustable wear surface (17) on a distal side of the stationary cutter jaw (2). Replaceable cutter blades and steady rest surfaces (17) are positional conveniently on the stationary cutter jaw in selective relationship to the bolt-on replaceable cutter tip (14). A steady rest bearing (19, 57) is extendable from the pivotal jaw and adjustably positional in slidable contact with a surface of the stationary cutter jaw. Roller bearings (25, 26, 64) are provided optionally for decreasing friction workload and for increasing use life.

22 Claims, 8 Drawing Sheets

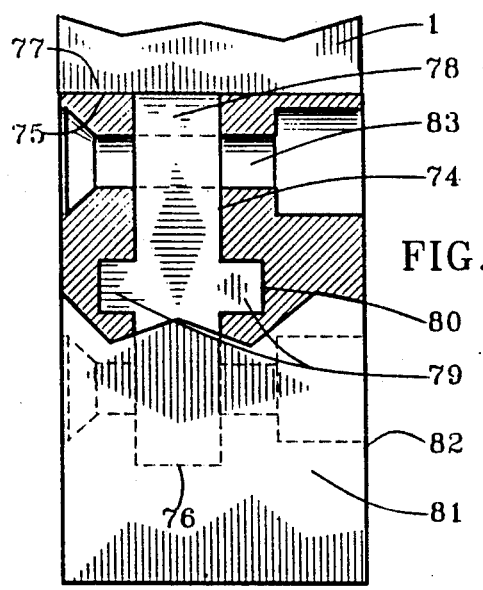
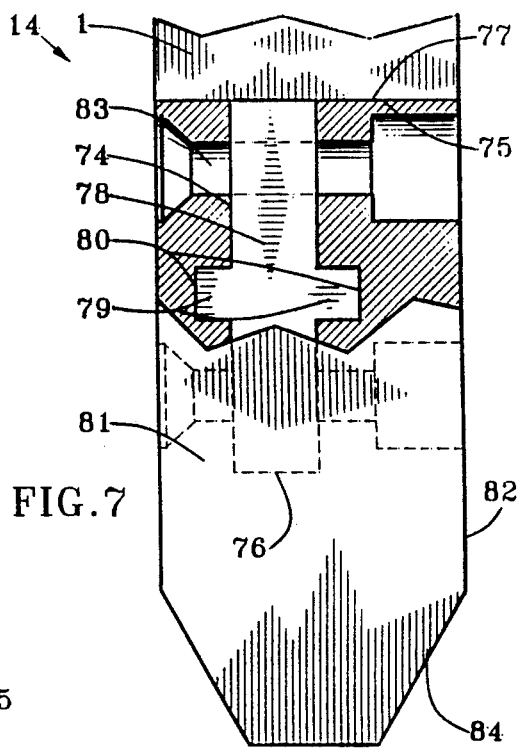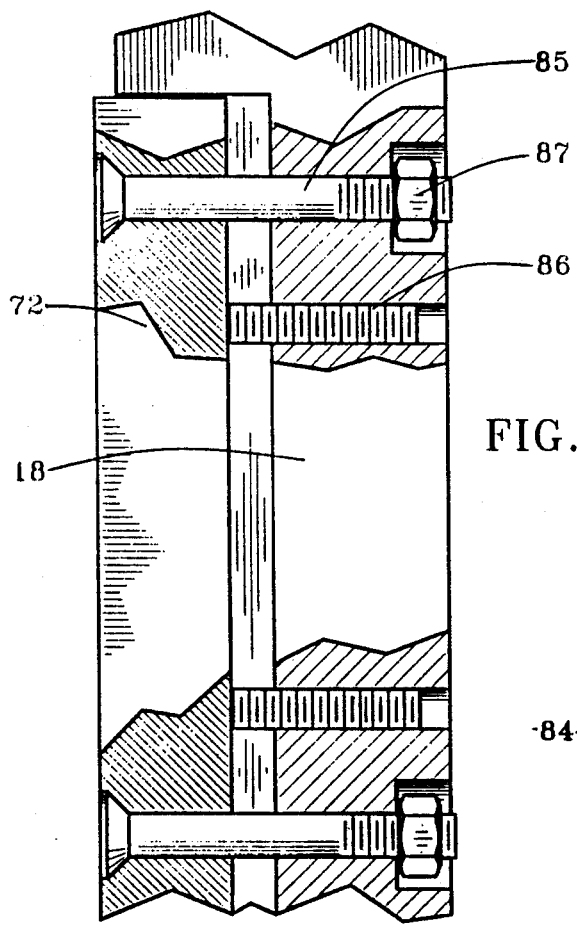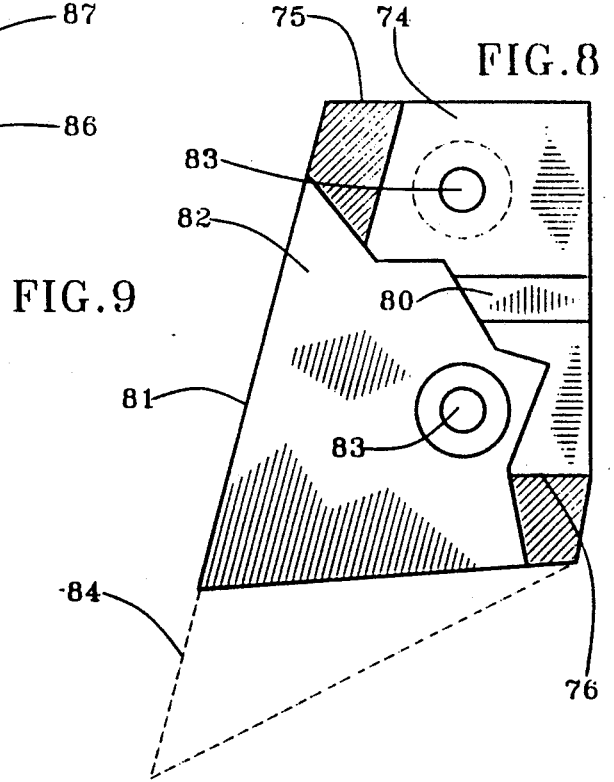

METAL DEMOLITION SHEAR

BACKGROUND OF THE INVENTION

I. Field of the Invention

The present invention relates generally to the field of heavy duty demolition shears that are mountable on equipment such as backhoes or power shovels and have manipulatable booms that are powered hydraulically. More particularly, it provides resistance to spreading of cutter blades and a replaceable cutter point that is positional on an end of a pivotal cutter jaw with cutter blades. The replaceable cutter point and cutter blades on the cutter jaws are adjustable in closeness to a stationary cutter jaw with cutter blades by means of selectively positioning a pivot bearing and linear thrust abutments of the pivotal cutter jaw linearly on a cutter axle in pivotal relationship between the pivotal cutter jaw and the stationary cutter jaw. The replaceable cutter point and cutter blades are maintainable in select closeness to the stationary cutter jaw by means of slidable contact of an extension of the pivotal cutter jaw against a surface of the stationary cutter jaw or by optional slidable contact of the replaceable cutter point against a replaceable bearing surface on the stationary cutter jaw.

II. Description of the Prior Art

Heavy duty metal demolition shears mounted on backhoes have proven very effective in the last several decades They are used variously for demolishing, cutting and handling large discarded metal objects and structures having metal girders, pipe, beams, cable and other items for recycling or disposal A wide variety of such demolition shears have been developed and used previously. None, however, are known to have a sufficiently steady and sturdy means for adjusting and maintaining precise closeness of cutting relationship between stationary and pivotal cutter jaws and between a replaceable cutter point on a pivotal jaw and stationary cutter edges in cutting relationship to the replaceable cutter point For cutting metal with any type of metal cutting means, the same as with powered demolition shears, steadiness and precision of cutter positioning are critical When optimum positioning and straight cutting of a metal cutter are lost due to looseness of fit, or when a shear blade vacillates due to unsteadiness, flexibility or bending, cutting action veers off at an angle. The metal being cut then abrades, distorts, overheats and in various ways destroys the metal cutter in addition to losing cutting efficiency. In heavy duty demolition shears, the most obvious symptom or effect is spreading of distance between the jaw blades. Like a flexible pair of scissors, the blades spread apart, become dull and loose effectiveness. This condition is far more pronounced and detrimental in metal cutting than in cutting more pliable material, however, due to the incompressible nature and abrasiveness of metal.

This metal cutting principle has not been recognized sufficiently for its effective application in demolition shears previously. Results have been short use life and less cutting efficiency than can be achieved with this invention Examples of different but pertinent prior art are described in the following patent documents.

| COUNTRY | NUMBER | DATE | NAME |
|---|---|---|---|
| U.S. | 4,897,921 | Feb. 6, 1990 | Ramun |
| U.S. | 4,872,264 | Oct. 10, 1989 | LaBounty |
| U.S. | 4,686,767 | Aug. 18, 1987 | Ramun et al |
| U.S. | 4,670,983 | Jun. 9, 1987 | Ramun et al |
| U.S. | 4,558,515 | Dec. 17, 1985 | LaBounty |
| U.S. | 4,519,135 | May 28, 1985 | LaBounty |

The Ramun 1990 patent described replaceable blades on shear jaws, including a replaceable shear point, and means for guiding shearing motion of shear blades. But it did not teach a means for adjustment of a jaw guiding means and adjustment of a linear thrust bearing means in coordination with a guide means as taught by this invention. The LaBounty 1989 patent taught a plate shearing device with neither a replaceable shear point nor an adjustable blade positioning means in combination with an adjustable linear thrust bearing. The Ramun et al August 1987 patent taught a replaceable cutter tip and an adjustable thrust bearing. But its thrust bearing was adjustable in only one direction. There was no coordinated adjustment of travel guide for cutter jaws and the means for adjustment of the thrust bearing was different than taught by this invention. The Ramun et al June, 1987 patent was not significantly different from the Ramun et al August, 1987 patent in relation to the same features. The LaBounty December, 1985 patent did not teach either a replaceable cutter tip nor a jaw travel guide separately from a pivotal axle. The LaBounty May, 1985 patent described a form of pressure plate that arrested side travel of the pivotal cutter jaw. But it was not adjustable either separately or in conjunction with linear positioning of the pivotal cutter blade on a pivot axle as taught by this invention. No single patent known in the prior art and no combination of known prior art is believed to provide the advantages and features of this invention without inventive change.

SUMMARY OF THE INVENTION

In accordance with the present invention, it is contemplated that one objective of this invention is to provide linear thrust bearings on a pivot axle of a demolition shear that are adjustable in both opposite linear directions to position a pivotal cutter jaw optimally in relation to a stationary cutter jaw of a demolition shear.

Another objective is to provide a steady rest guide to pivotal travel of the pivotal cutter jaw of a demolition shear.

Another objective is to provide jaw spacing adjustability of a steady rest guide in coordination with adjustability of linear positioning of thrust bearings on the pivot axle.

Another objective of this invention is to provide a replaceable cutter tip with select cutting and steady rest relationship between the stationary cutter jaw and the pivotal cutter jaw of a demolition shear.

Yet another objective resulting from the working relationship of parts of this invention is to provide more efficient cutting action with less power requirement and longer use life of cutter blades and related machinery.

Yet a specific objective of the invention is the provision of bolt-on tip and other wear surfaces on the cutter jaws for ease of maintenance and replacement in the field, thereby eliminating the previous problem of having to cut worn tips and surfaces from cutter jaws and then effecting replacement by welding in the field.

This invention accomplishes the above and other objectives with a metal demolition shear and material handling device having a pivotal axle with threading means at opposite ends for adjusting linear positioning of thrust bearings in order to adjust closeness of a pivotal jaw to a stationary cutter jaw of a demolition shear. A bolt-on replaceable cutter tip is positional on a distal end of the pivotal jaw in slidable contact with an adjustable wear surface on a distal side of the stationary cutter jaw. Replaceable cutter blades and steady rest surfaces are positional conveniently on the stationary cutter jaw in selective relationship to the replaceable cutter tip. A steady rest bearing is extendible from the pivotal jaw and adjustably positional in slidable contact with a surface of the stationary cutter jaw. Roller bearings are provided optionally for decreasing friction workload and for increasing use life.

Other objects, advantages and capabilities of the invention will become apparent from the following description taken in conjunction with the accompanying drawings showing preferred embodiments of the invention.

BRIEF DESCRIPTION OF THE DRAWINGS

FIG. 6 is a cutaway front view of a bolt-on replaceable cutter tip;

FIG. 7 is a cutaway front view of a bolt-on replaceable cutter tip having a beveled side;

FIG. 8 is a cutaway side view of the FIG. 6 tip with an optional extension shown in FIG. 7;

FIG. 9 is a cutaway top view of an optional positional adjustment means for attaching replaceable wear surfaces, cutter blades, a cutter tip extension and steady rest bearing surfaces;

DESCRIPTION OF THE PREFERRED EMBODIMENTS

Figure 1:
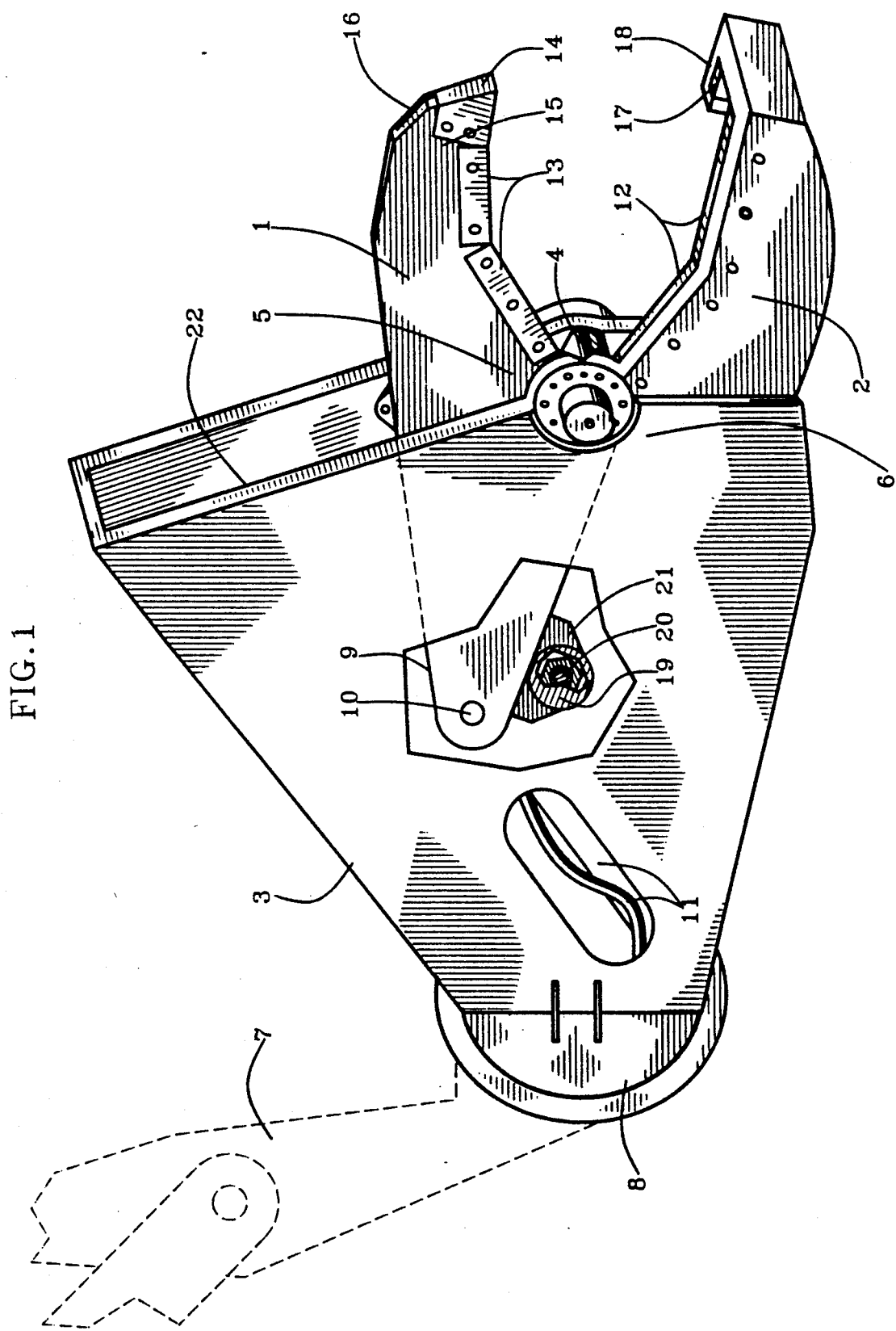
FIG. 1 is a cutaway perspective view.

Referring to the drawings wherein like reference numerals designate corresponding parts throughout the several figures, reference is first made to FIG. 1 wherein a pivotal cutter jaw 1 is actuated in scissor-like relationship to a stationary cutter jaw 2 that is mounted rigidly on a shear housing 3. The pivotal jaw 1 pivots on a pivot axle 4 at a jaw fulcrum section 5 and a housing fulcrum section 6. The shear housing 3 is attached to a standard boom 7 of such equipment as a backhoe or a power shovel. Various types of attachment bases 8 can be employed to attach the shear housing 3 to a boom 7 for desired operation. The pivotal cutter jaw 1 has an actuation lever 9 with an attachment joint 10 to which various hydraulic mechanisms 11 can be attached for leveraged operation. At least one stationary wear surface 12 can be provided on the stationary cutter jaw 2 and at least one pivotal wear surface 13 can be provided on the pivotal cutter jaw 1. A bolt-on replaceable cutter tip 14 is positional on a distal end 15 of the pivotal cutter jaw 1. Positional on the pivotal cutter jaw 1 also is a tip extension 16. A jaw steady rest surface 17 is provided at a distal side 18 of the stationary cutter jaw 2. A lever steady rest bearing 19 can be positioned on the actuation lever 9 to leverage against spreading of the cutter jaws 1 and 2. The lever steady rest bearing 19 is positional on a bearing boss 20 that is positionally adjustable in relation to a mount 21 on the actuation lever 9. The steady rest bearing lever 19 is in slidable contact with a bearing surface on an inside portion of proximal housing wall 22.

With this invention, large metallic and other hard scrap objects are picked up, cut or carried between the jaws 1 and 2. The bolt-on replaceable cutter tip 14 can either hold, puncture or initiate cutting action of metallic objects such as discarded engines, metal framework or machinery. Metal being cut is pushed towards the pivot axle 4 by angled structure of the cutter jaws 1 and 2. There near the respective fulcrum sections 5 and 6, mechanical advantage is greatest for holding or for cutting action.

Figure 2:
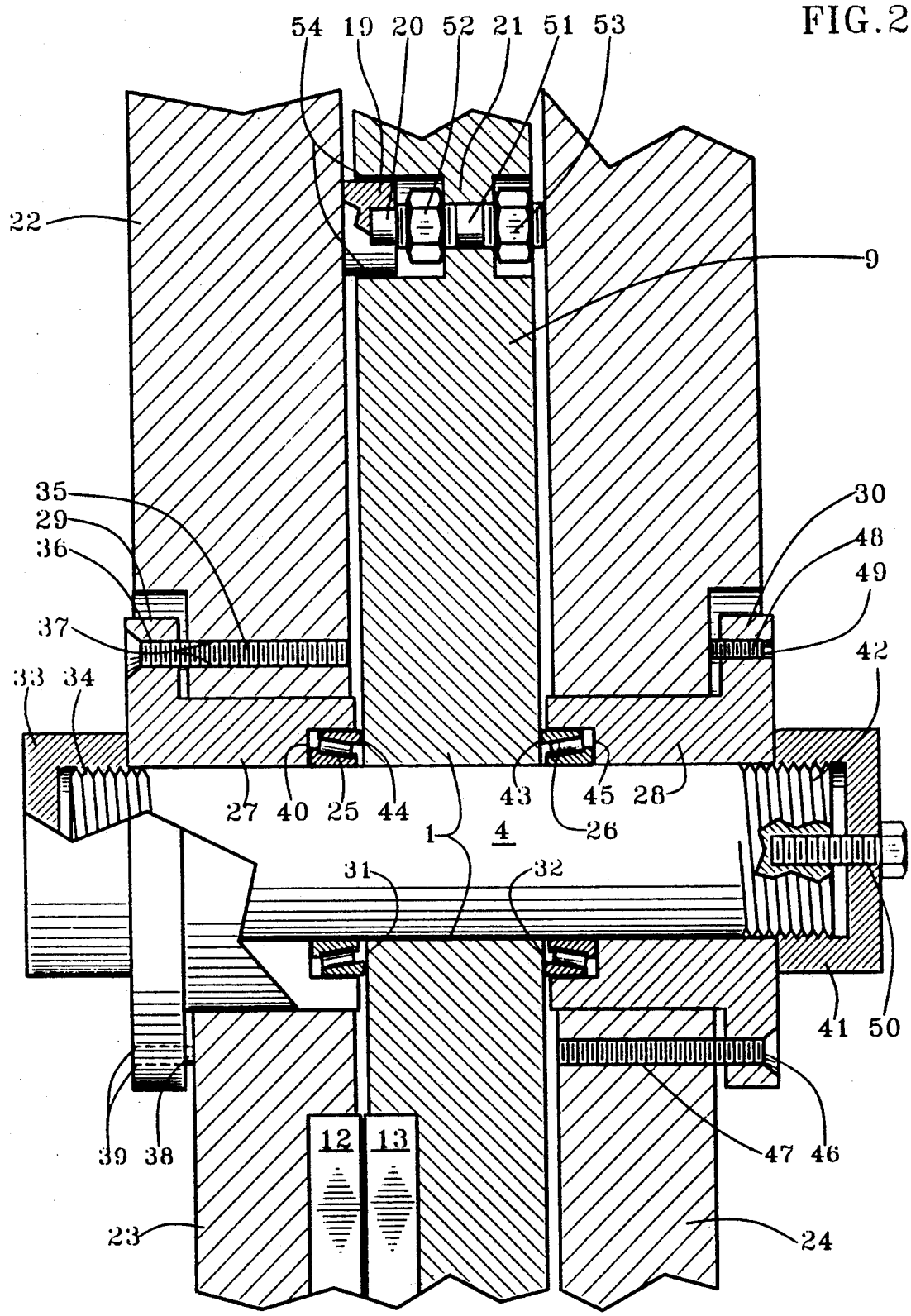
FIG. 2 is sectional top view of an embodiment having a steady rest bearing.

Referring to FIG. 2, the pivotal cutter jaw 1 is maintained at a desired position between a proximal stationary cutter side 23 and a distal stationary cutter side 24 by proximal bearing 25 and distal bearing 26. The bearings 25 and 26 are positioned by proximal bearing sleeve 27 and distal bearing sleeve 28 having proximal bearing flange 29 and distal bearing flange 30 respectively. The proximal bearing sleeve 27 and flange 29 are used to control positioning of both sleeves 27 and 28. Distal bearing sleeve 28 and flange 30 are then used to adjust tightness of bearings 25 and 26 against pivotal cutter jaw proximal side 31 and distal side 32. The bearings 25 and 26 can be tapered roller bearings as illustrated in this embodiment of the invention. Bearings 25 and 26 can be positioned with the taper in either direction as desired for ease of construction and utilization of space.

In order to accomplish this, pivot axle 4 is rigidly attached to proximal axle cap 33, preferably by means of proximal axle threads 34 being threaded into proximal axle cap 33 and then lightly welding the proximal axle cap 33 to axle 4. Then a plurality of proximal bearing bolts 35 are inserted through unthreaded proximal flange orifices 36 and screwed into threaded proximal bearing bolt orifices 37 a select distance. Proximal positioning bolt 38 is then threaded into proximal positioning bolt orifice 39 a select distance in opposition to threaded positioning of the proximal bearing bolts 35. In accordance with desired positioning of proximal bearing 25 against a proximal bearing wall 40 in the proximal bearing flange 27, the proximal bearing bolts 35 and the proximal positioning bolts ar threaded select relative distances into their respective threaded orifices 37 and 39 and tightened.

This prevents movement of the proximal flange 29 in either direction. It also locks the respective bolts against sides of threads in directions of thrust in accordance with effective threading technology.

A distal axle cap 41 is then threaded onto distal axle threads 42 and driven against distal sleeve 28 and flange 30. This positions a proximal side 43 of distal bearing 26 against a cutter jaw distal side 32 when a distal side 44 of proximal bearing 25 is prevented from proximal direction travel by proximal bearing wall 40. This positions bearings 25 and 26 between proximal bearing wall 40 and a distal bearing wall 45. Then distal flange 30 is locked into position the same as the proximal flange 29 by means of distal bearing bolts 46 being threaded into threaded distal side bolt orifices 47 in opposed threading relationship to distal positioning bolts 48 in threaded distal positioning bolt orifices 49. The distal axle cap 41 can be threaded outwardly in a distal direction slightly and thread locked with a distal thread lock bolt 50. This allows the axle 4 to rotate slightly in order to position wear evenly on a circumferential periphery of axle 4.

The positioning bolts 38 and 48 can be set screws without bolt heads to come in contact with materials being handled. For the same reason, the bearing bolts 35 and 46 can be flat head socket screws that are countersunk into the flanges. Also to avoid contact of fastener edges with materials being handled, the axle caps 33 and 41 can be round and rotated with prong wrenches in prong orifices or with pipe turning tools.

The pivotal cutter jaw 1 is positional precisely by the bearings 25 and 26 by positioning of sleeves 27 and 28 in order to position pivotal wear surface 13 a precise distance from stationary wear surface 12.

Adjustable positioning of the lever steady rest bearing 19 in distance from a mount 21 is illustrated by a steady rest positioning bolt 51 in relation to proximal positioning fastener nut 52 and distal positioning fastener nut 53. Positioning of the bolt 51 by relative position of the nuts 52 and 53 positions the bearing boss 20 and thereby positions the bearing 19.

The mount 21 is illustrated as part of the actuation lever 9. When part of the lever 9, rather than an appendage as shown in FIG. 1, the bearing 19 can be supported additional by bearing walls 54. However, adjustment nuts 52 and 53 are not as easily accessible in this form.

Figure 3:
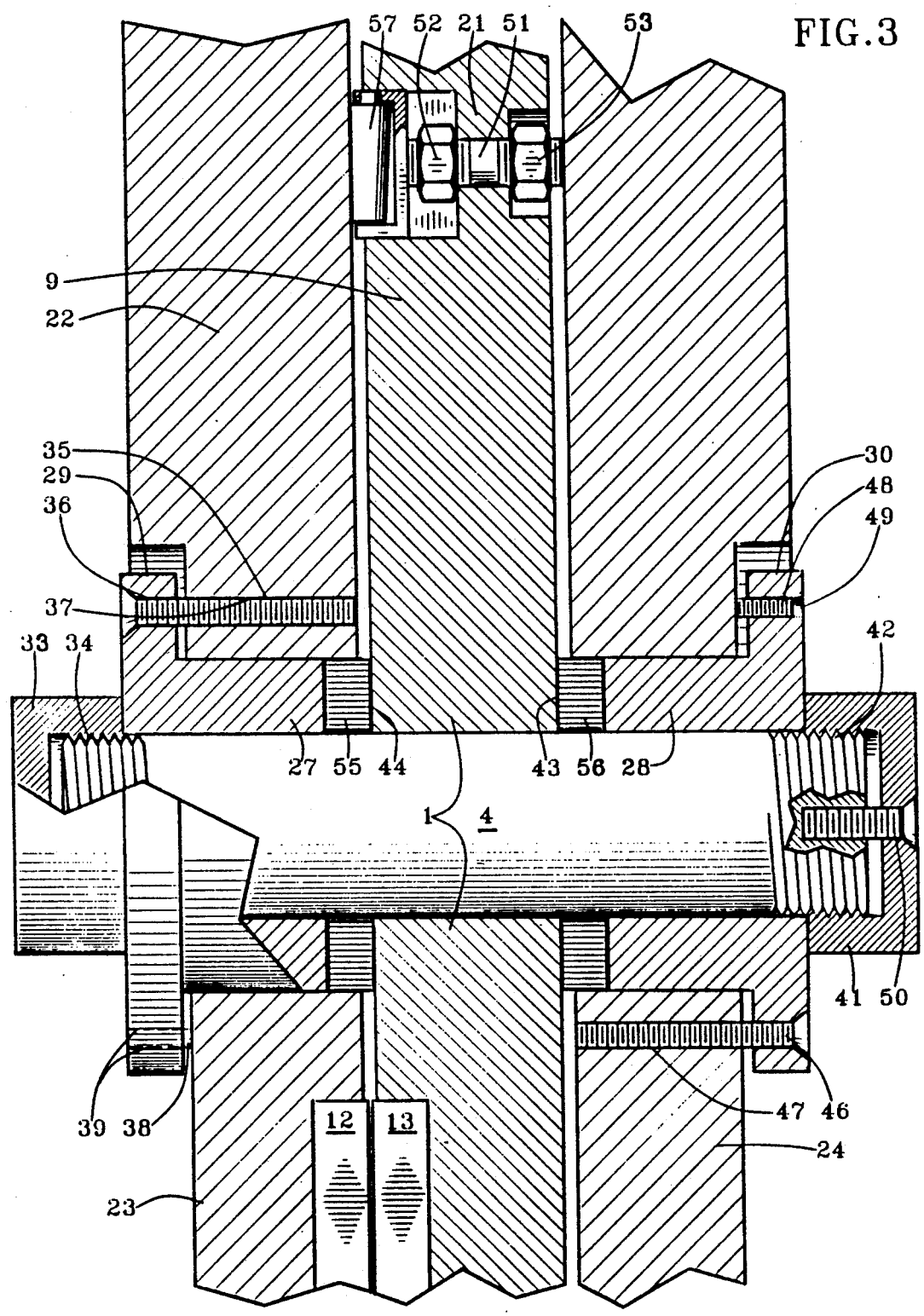
FIG. 3 is a sectional top view of an embodiment having a roller-type of steady rest bearing and friction thrust bearings.

Referring primarily now to FIG. 3, friction proximal bearing 55 and friction distal bearing 56 can be employed in place of the tapered roller bearings 25 and 26 illustrated in FIG. 2. Also, a roller steady rest bearing 57 can be positional on the steady rest positioning bolt 51 alternatively to the friction steady rest bearing 1 illustrated in FIGS. 1 and 2. Positioning of steady rest bearing 57 can be achieved in a similar manner to positioning of friction steady rest bearing 19.

Use of friction bearings 55 and 56 in combination with roller steady rest bearing 57 is an optional combination. Any combination of the components are foreseeably included in this invention.

Figure 4:
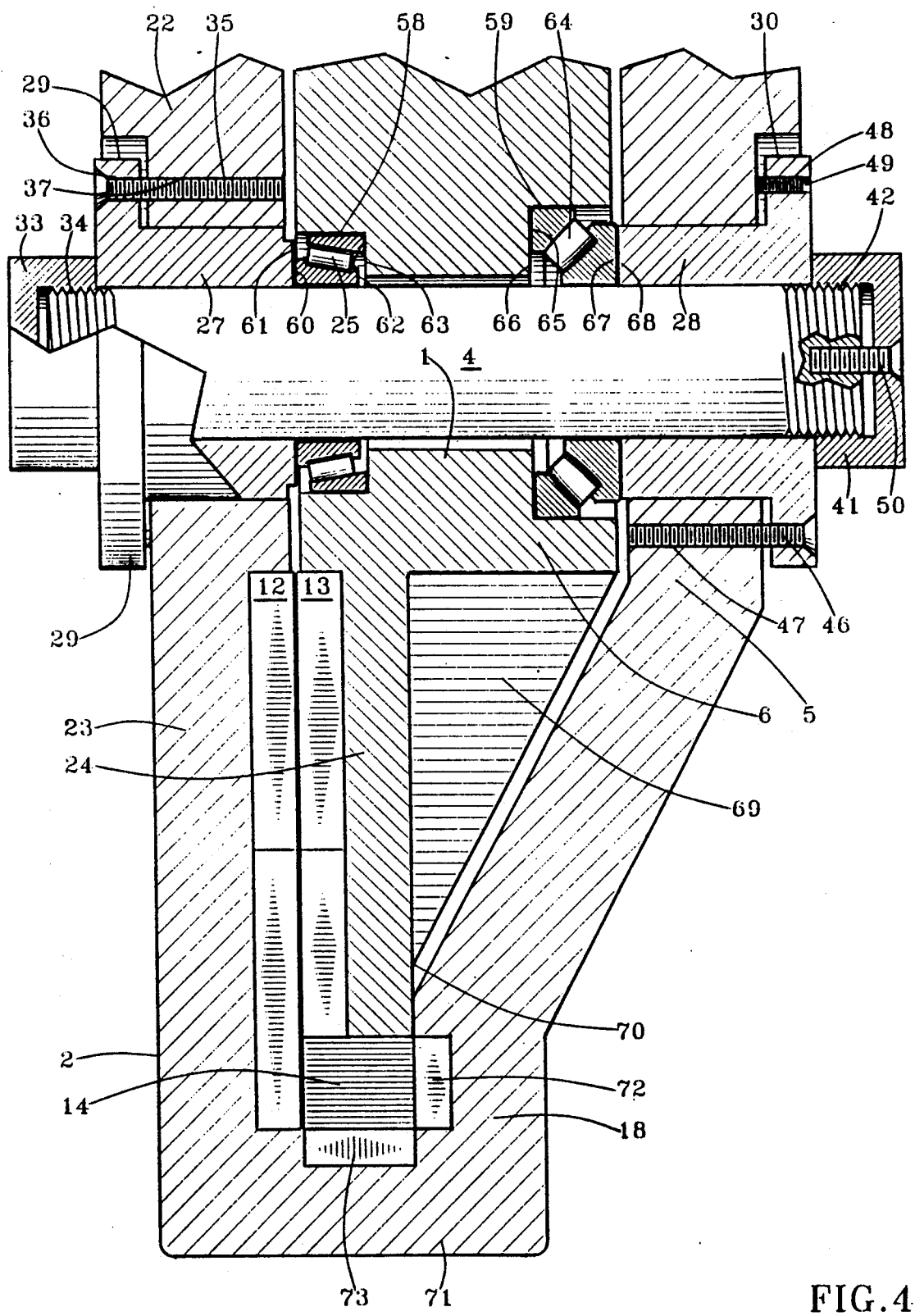
FIG. 4 is a sectional top view of a tapered roller bearing at one side of a cutter jaw and a spherical roller thrust bearing at the opposite side in an embodiment with flange bearing positioning of thrust surfaces.

Referring to FIG. 4, pivotal cutter jaw 1 can have a proximal bearing step 58 and a distal bearing step 59 in which mixed or similar bearings can be positioned. In this embodiment, a proximal tapered roller bearing 25 is positional with an outside periphery snugly fittable into the proximal bearing step 58, an inside periphery snugly fittable onto the pivot axle 4, a proximal end 60 against a distal end 61 of proximal sleeve 27, and a distal end 62 against a proximal bearing step wall 63. A distal spherical roller thrust bearing 64 is positional with an outside periphery snugly fittable into the distal bearing step 59, an inside periphery snugly fittable onto the pivot axle 4, a proximal end 65 against a distal bearing step wall 66, and a distal end 67 against a proximal end 68 of distal sleeve 28. The pivotal cutter jaw 1 rides on the friction reducing bearings 25 and 64 instead of directly on the pivot axle 4. Positioning of the bearings 25 and 64 is the same as described in relation to FIGS. 2 and 3. However, the pivotal cutter jaw 1 is wider to accommodate internal bearings. This widening configuration also provides a steady rest resistance to spreading of pivotal cutter jaw 1 and stationary cutter jaw 2. The wideness can be at fulcrum sections 5 and 6 of the respective cutter jaws 1 and 2. An angular brace 69 on either or both jaws 1 and 2 can provide angular support of a pivotal jaw distal end base 70 and a stationary jaw distal end base 71 respectively.

In this mixed bearing embodiment, distal spherical roller thrust bearing 64 is positioned to absorb maximum linear thrust and spreading action of the cutter jaws 1 and 2. At the same time, tapered roller bearing 25 is positioned to absorb maximum axial thrust and minimal linear thrust that will occur in a proximal direction.

The bolt-on replaceable cutter tip 14 is shown in positional relationship to an adjustably positional wear surface 72 on the distal side 18 of the distal end 71 of the stationary cutter jaw 2. Also shown in positional relationship to the bolt-on replaceable cutter tip 14 is a stationary jaw distal blade 73.

Figure 5:
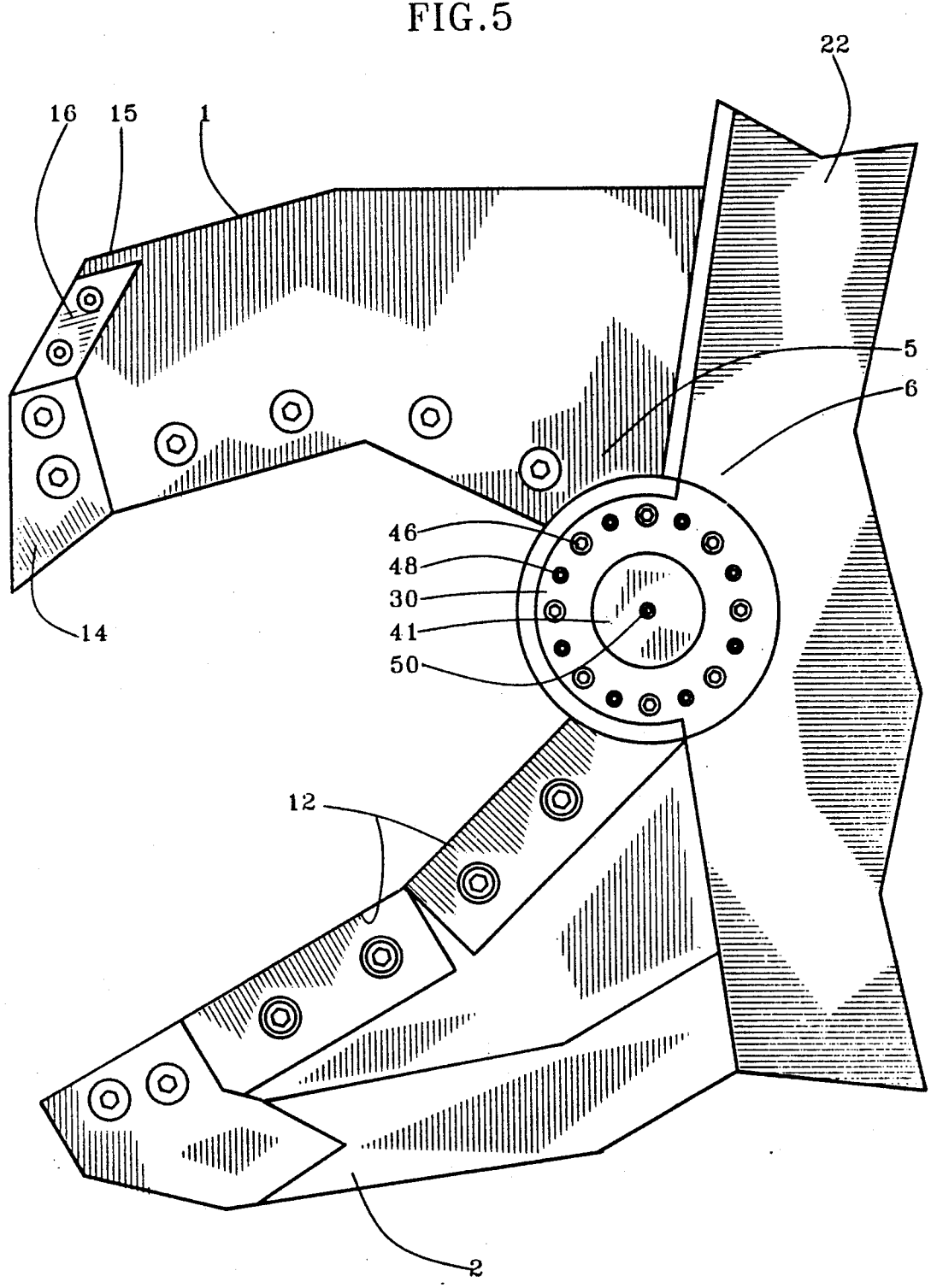
FIG. 5 is a sectional distal side view of the cutter jaws with a bolt-on replaceable tip and tip extension in combination with a positional adjustment wear surface on the stationary cutter jaw.

Referring to FIG. 5, the bolt-on replaceable cutter tip 14 is shown from a distal side below a optional tip extension 16. A plurality of distal bearing bolts 46 are shown in hole pattern relationship to distal positioning bolts 48 in distal bearing flange 30. The same bolt pattern relationship exists for proximal bearing flange 29. The distal bearing cap 41 is shown with a distal thread lock bolt 50.

Referring to FIGS. 6-8, the bolt-on replaceable cutter tip 14 can have a positioning channel 74 extended from a top abutment surface 75 to a bottom abutment wall 76. The top abutment surface 75 is positional against a tip cutter step 77 on the pivotal cutter jaw 1 to arrest upward travel of the cutter tip 14 in opposition to cutting action against material being cut, held or penetrated. A tip ridge 78 on the jaw 1 is inserted into the positioning channel 7 to prevent side travel of the tip 14. A horizontal cross ridge 79 on the tip ridge 78 is inserted into a matching channel cross 80 to arrest downward travel of the tip 14 when being removed from material. Front cutting is accomplished at a tip front surface 81 and side cutting is accomplished at a side surface 82. The positioning channel 74 and the tip ridge 78 fittable into it are off centered to a proximal side because the bolt-on replaceable cutter tip 14 provides a steady rest function by sliding contact with an adjustably positional jaw steady rest surface 72 in opposition to cutter blades 13 on a proximal side of the pivotal cutter jaw 1. For optimal utilization of structural material, therefore, a greater portion of the bolt-on replaceable cutter tip 14 is positioned on the distal side. Countersunk tip fastener orifices 83 are provided to isolate fastener nuts and heads from contact with materials. A beveled tip edge 84 can be provided on a downward tip extension for gradual contact of the bolt-on replaceable tip 14 before it provides steady rest opposition to spreading of the jaws 1 and 2. Because the tip 14 must be in sliding contact with the adjustably positional jaw steady rest surface 72, impact of the cutter tip 14 on the surface 72 could occur without the beveled tip edge 84 in some use conditions. A beveled tip edge 84 at both sides is desirable as illustrated.

Referring to FIG. 9, the adjustably positional jaw steady rest surface 72 is adjustable in distance from the distal side 18 of the stationary jaw 2 to compensate for linear positional adjustment of the pivotal cutter jaw 1 in nearness to cutter blades 12 on the stationary cutter jaw 2. The adjustably positional steady rest surface 72 rests on a blade step, the same as other wear surfaces which are also referred to as cutter blades. A preferable means for adjustment of distance of the steady rest surface 72 from the distal side 18 of the stationary jaw 2 is the use of opposing bolts similar in principle to the positioning of the bearing flanges 29 and 30. A blade retainer bolt 85 is tightened against positioning resistance of a blade positioning bolt 86. The blade retainer bolt 85 is preferably a flat head socket screw countersunk in a blade 12, 13, 17, 72 or 73 to avoid contact with materials being handled. A fastener nut 87 can be countersunk in a wall to which the said blades are attachable. The positioning bolt 86 can be a set screw. A plurality of either the retainer bolt 85 or the positioning bolt 86 is essential. A plurality of both is preferable for most use conditions.

Figure 10:
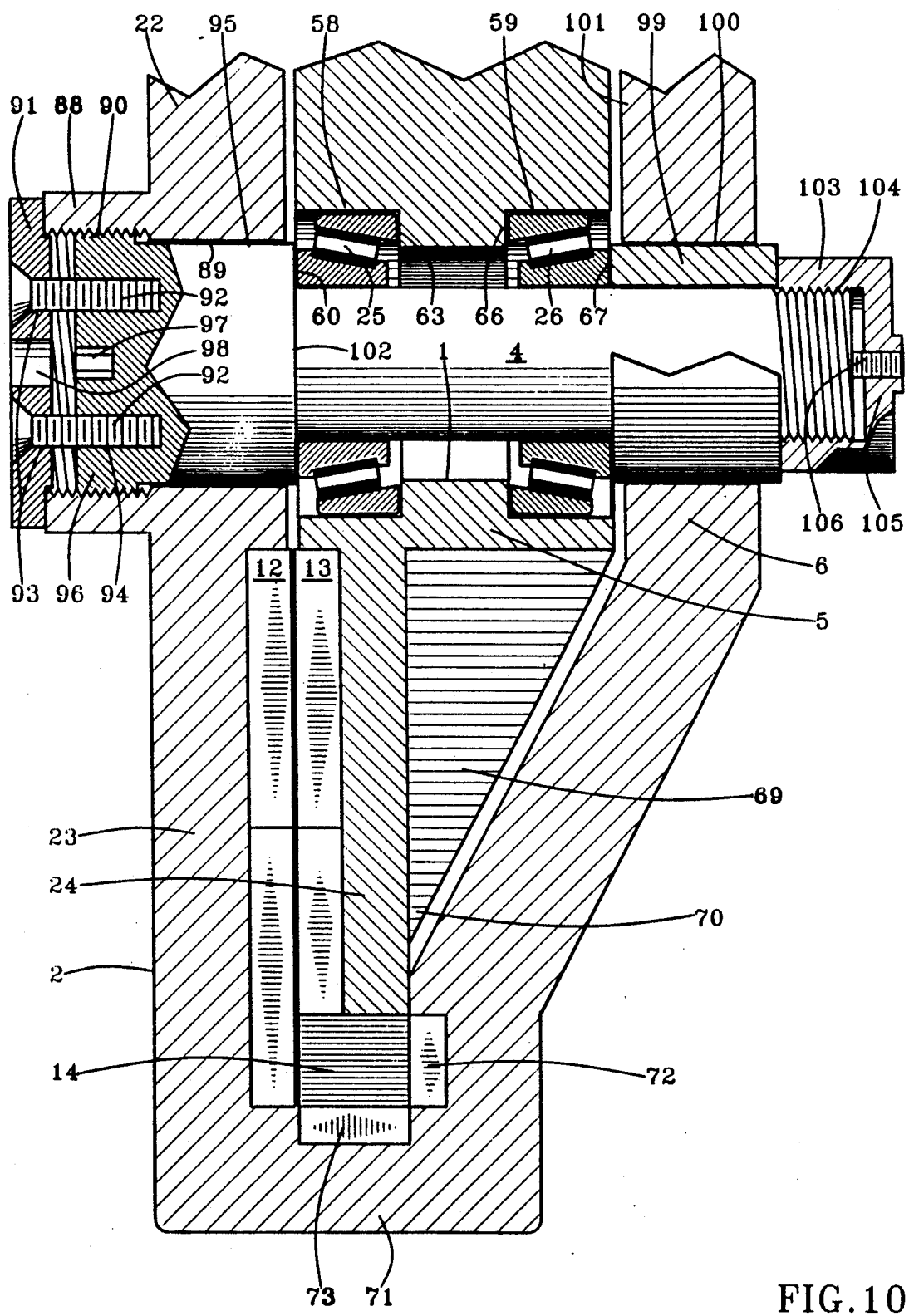
FIG. 10 is a cutaway top view of an embodiment with an optional positional adjustment sleeve and tapered roller bearings on which the pivotal cutter jaw rides.

Referring to FIG. 10, a positioning sleeve embodiment of this invention employs a positioning sleeve 88 extended concentrically outward from a proximal bearing orifice 89. Internal positioning threads 90 in the positioning sleeve 88 have a minimum diameter selectively greater than an internal diameter of the proximal bearing orifice 89 and are extended from a proximal end of the positioning sleeve 88 to a position proximate the proximal bearing orifice 89. An axle lock member 91 is positional on a proximal end of the positioning sleeve 88. Axle lock bolts 92 are extended through axle lock orifices 93 and screwed into threaded lock bolt orifices 94 in a stepped end 95 of axle 4. The axle 4 is locked into a desired linear position by opposing thread relationship between the axle lock bolts 92 and a threaded proximal end 96 of the axle 4 positioned in the internal positioning threads 90. A plate-like axle lock member 91, therefore, provides a function similar to that of the proximal bearing flange in other embodiments of this invention, but with a smaller diameter to allow positioning of cutter blades 12 and 13 closer to the axle 4 for increased mechanical advantage in shearing action of the jaws 1 and 2. Before being thread locked in position, the axle 4 can be rotated in threads 90 with a wrench in internal wrench flat orifice 97 that is accessed through wrench access orifice 98 in the axle lock member 91.

With the axle 4 thread locked in a desired linear position, a distal bearing sleeve 99 is positioned in a distal bearing orifice 100 in a distal side 101 of the shear housing 3. The distal bearing sleeve 99 can be positioned snugly against a distal bearing 26 to arrest linear thrust of pivotal cutter jaw 1 between a proximal step wall 102 and the distal sleeve 99. When the proximal bearing 25 and the distal bearing 26 are large enough, they can be employed to carry radial thrust in addition to linear thrust as explained in relation to FIG. 4. The distal bearing sleeve 99 can be positioned with a threaded distal sleeve extension 103 that can be either part of or separate from distal bearing sleeve 99. In either construction, the threaded distal sleeve extension 103 is threaded onto axle distal threads 104. The distal bearing sleeve 99 separately or the threaded distal sleeve extension 103 can be in the form of a distal axle cap with an end plate 105 thread locked with distal thread lock bolt 106.

Figure 11:
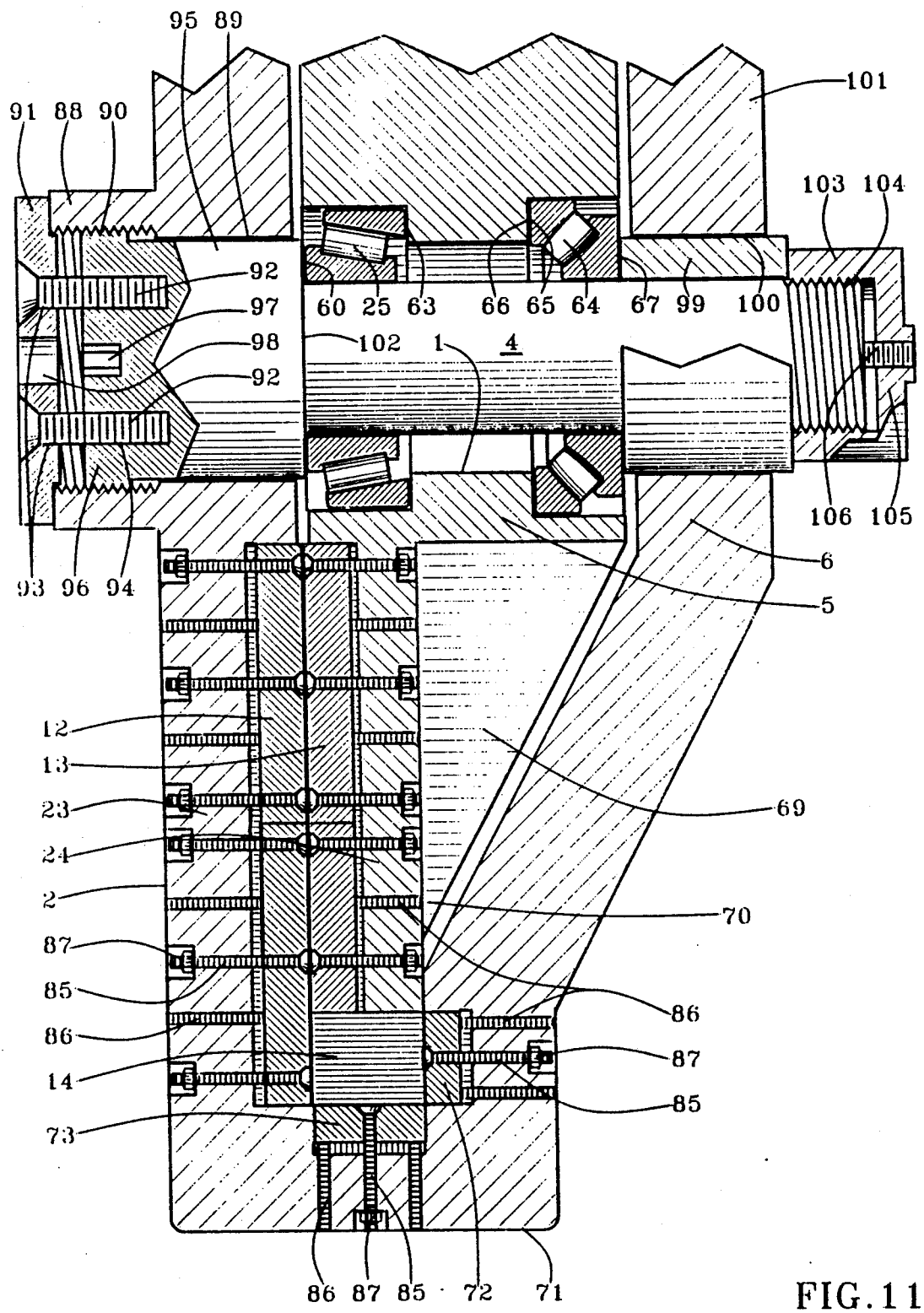
FIG. 11 is a cutaway top view of the FIG. 10 embodiment with mixed bearings in the forms of a tapered roller proximal bearing and a distal spherical roller thrust bearing.

Referring to FIG. 11, the same as explained in relation to FIGS. 4 and 10, a combination of bearings such as bearings 25 and 64 can be employed with the positioning sleeve 88 and axle lock member 91. As explained in relation to FIG. 9, blade retainer bolts 85 and blade positioning bolts 86 can be employed to position cutting blades, also referred to as wear surfaces 12, 13, 72 and 73, precisely in addition to linear positioning of pivotal cutter jaw 1.

Various modifications may be made of the invention without departing from the scope thereof and it is desired, therefore, that only such limitations shall be placed thereon as are imposed by the prior art and which are set forth in the appended claims.

What is claimed is:

1. A demolition shear comprising:
   a shear housing having a walled interior,
   an attachment base on a proximal end of the shear jaw housing sized and shaped for attachment of the demolition shear in standard manipulatable mode to an operative end of a boom of a mobile machine such as a backhoe, a power shovel or a tractor which has a hydraulic power mechanism and related hydraulic lines,
   a stationary cutter jaw extended from a distal end portion of the shear housing,
   a pivot axle positional in a fulcrum portion of the shear housing proximate a proximal end of the stationary cutter jaw,
   a pivotal cutter jaw having a pivot orifice at a fulcrum portion of the pivotal cutter jaw through which the pivot axle is insertable and a jaw actuation lever on an opposite side of the pivot axle from the pivotal cutter jaw,
   a hydraulic actuation means in standard hydraulically powered relationship between hydraulic controls on the mobile machine and standard hydraulically powered actuation of the pivotal cutter jaw by actuation of the jaw actuation lever with a lever action in which the pivot axle is a fulcrum for pivotal travel of the pivotal cutter jaw in shearing relationship to the stationary cutter jaw,
   a linear thrust bearing positional on the pivot axle between opposite sides of the pivotal cutter jaw and internal wall surfaces of the shear housing,
   a machine thread means in selective linear positioning relationship of the pivotal cutter jaw between internal wall portions of the shear jaw housing,
   selective linear distance of the pivotal cutter jaw from the stationary cutter jaw for optimum shearing relationship being achieved by means of linearly positioning opposite thrust bearings between opposite sides of the pivotal cutter jaw and internal wall surfaces of the jaw housing,
   a bolt-on replaceable cutter tip positional selectively on a distal end of the pivotal cutter jaw,
   at least one cutter blade positional between a distal portion and a proximal portion of the stationary cutter jaw,
   at least one cutter blade positional between the replaceable cutter tip and the pivotal portion of the pivotal cutter jaw,
   a steady rest bearing member on the pivotal cutter jaw in movable contact with a steady rest bearing surface of the shear housing, and
   a means for adjustment of distance between the steady rest member and the steady rest bearing.

2. A demolition shear according to claim 1 wherein the machine thread means in selective linear positioning relationship of the pivotal cutter jaw between opposite sides of the of the shear housing is comprised of:

a proximal bearing orifice in a proximal side of the shear housing, a distal bearing orifice in a distal side of the shear housing and having an axis concentric to the proximal bearing orifice, a proximal bearing sleeve having an outside cylindrical periphery snugly fittable in an inside cylindrical periphery of the proximal bearing orifice and an inside cylindrical periphery into which the pivot axle is snugly fittable, a proximal sleeve flange at a proximal end of the proximal bearing sleeve, a distal bearing sleeve having an outside cylindrical periphery snugly fittable in an inside cylindrical periphery of the distal bearing orifice and an inside cylindrical periphery into which the pivot axle is snugly fittable, a distal sleeve flange at a distal end of the distal bearing sleeve, a plurality of threaded proximal side orifices in the proximal side of the shear housing positioned in a desired pattern exterior to the proximal bearing orifice, a plurality of proximal flange orifices in the proximal bearing flange concentric with select threaded proximal side orifices, a plurality of threaded distal side orifices in the distal side of the shear housing positioned in a desired pattern exterior to the distal bearing orifice, a plurality of distal flange orifices in the distal bearing flange concentric with select threaded distal side orifices, a proximal thrust bearing having a cylindrical interior periphery positional on the pivot axle, a proximal end wall positional against a bearing wall on the proximal bearing sleeve and having a distal end wall positional against a proximal side of the pivotal cutter jaw, a distal thrust bearing having a cylindrical interior periphery positional on the pivot axle, a distal end wall positional against a bearing wall on the distal bearing sleeve and having a proximal end wall positional against a distal side of the pivotal cutter jaw, external machine threading on a distal end of the pivot axle, a distal axle cap threadable onto the distal end of the pivot axle, internal threading in the distal end of the pivot axle, a bolt orifice in the distal axle cap, a threaded bolt positional in the internal threading in the distal end of the pivot axle, a proximal end of the pivot axle rigidly attached to a proximal end axle cap, threaded flange bolts positional in the proximal sleeve flange orifices and extended selectively into select threaded proximal side orifices in the proximal side of the shear housing, threaded flange bolts positional in the distal sleeve flange orifices and extended selectively into select threaded distal side orifices in the distal side of the shear housing, threaded adjustment bolt orifices in a select pattern in the proximal sleeve flange and in the distal sleeve flange, and linear adjustment bolts positional in the threaded adjustment bolt orifices in the respective proximal and distal flanges and buttressed against the respective proximal and distal sides of the shear housing in opposition to the threaded flange bolts, such that linear positioning of the proximal and distal thrust bearings is achieved by entry distance of the threaded flange bolts in proportion to entry distance of the linear adjustment bolts at the proximal and distal sides of the shear housing and linear positioning of the thrust bearings is in a direction of increased entry distance of threaded flange bolts in proportion to entry distance of linear adjustment bolts at either the proximal or distal side of the shear housing with the threads lockable in opposed threading relationship.

3. A demolition shear according to claim 1 wherein the thrust bearing at each side of the pivotal cutter jaw is a tapered roller bearing.

4. A demolition shear according to claim 1 wherein the steady rest bearing on a steady rest bearing portion of the pivotal cutter jaw in movable contact with a steady rest bearing surface of the shear housing is comprised of:

a bearing support member positional on the jaw actuation lever, a bearing positional on the bearing support member in movable contact with an internal bearing surface on the shear housing, and a means for adjusting length of the bearing support member selectively in relation to linear positioning of the pivotal cutter jaw between proximal and distal sides of the shear housing such the that pivotal cutter jaw can be maintained in desired parallel relationship to the stationary cutter jaw.

5. A demolition shear according to claim 4 wherein the bearing support member is a bearing shaft threaded at both ends, a bearing mount boss extended from a distal end of the bearing shaft, a bearing positional on the bearing mount boss, a bearing shaft orifice in a bearing base on the pivotal jaw into which the bearing shaft is insertable and extendible from opposite sides and a fastener nut threadable onto each end of the bearing shaft at opposite sides of bearing base, the means for adjusting the length of the bearing support member being selectively positioning of the fastener nuts in relationship to the opposite sides of the bearing base.

6. A demolition shear according to claim 5 wherein the steady rest bearing is a friction bearing having a bearing mount orifice into which the bearing mount boss is insertable.

7. A demolition shear according to claim 5 wherein the steady rest bearing is a rotational bearing having a rotational housing means positional on the bearing mount boss.

8. A demolition shear according to claim 1 wherein the steady rest bearing is a bolt-on replaceable cutter tip having a distal side wall in slidable contact with an adjustably positional wear surface on the distal side of the stationary cutter jaw, adjustable positioning of the wear surface on the stationary cutter jaw being parallel to the pivot axle such that said adjustably positional wear surface on the distal side of the stationary cutter jaw is positional in lineal nearness to the bolt-on replaceable cutter tip for optimized slidable contact with the bolt-on replaceable cutter tip when the pivotal cutter jaw is positioned axially on the pivot axle.

9. A demolition shear according to claim 8 and further comprising:
a bolt-on replaceable extension of the bolt-on replaceable cutter tip positional on the pivotal cutter jaw adjacent to the bolt-on replaceable cutter tip in slidable contact with the adjustably positional wear surface on the distal side of the stationary cutter jaw.

10. A demolition shear according to claim 8 and further comprising:
a selectively beveled bottom distal edge of the bolt-on replaceable cutter tip, such that a sliding contact surface of the bolt-on replaceable cutter tip is caused to engage the adjustably positional wear surface on the stationary cutter jaw gradually after the selectively beveled bottom distal edge of the bolt-on replaceable cutter tip traverses a cutting edge of the adjustably positional wear surface on the stationary cutter jaw.

11. A demolition shear according to claim 1 and further comprising:
replaceable cutter blades that are selectively and adjustably positional on the distal side of the stationary cutter jaw, on the proximal side of the pivotal cutter jaw, on the distal side of the stationary cutter jaw and on the distal end of the stationary cutter jaw.

12. A demolition shear according to claim 8 and further comprising:
a means for adjusting distance between replaceable cutter blades and parallel surfaces of the respective pivotal cutter jaw and the respective cutter jaws to which they are attachable.

13. A demolition shear according to claim 12 wherein the means for adjusting distance between the replaceable cutter blades and the parallel surfaces of the respective pivotal cutter jaw and stationary cutter jaw to which they are attachable is comprised of at least one threaded fastener in fastener relationship between a replaceable cutter blade and a respective pivotal cutter jaw or stationary cutter jaw and at least one opposing threaded fastener in opposed threaded relationship such that the at least one threaded fastener is employable to draw the replaceable cutter blade towards the parallel surfaces of the respective pivotal cutter jaw and stationary cutter jaw and the at least one opposing threaded fastener is employable to oppose drawing power applied to the at least one threaded fastener selectively and threads of the respective fasteners are lockable with tightness in opposed threading relationship.

14. A demolition shear according to claim 1 wherein the machine thread means in selective linear positioning relationship of the pivotal cutter jaw between internal wall portions of the shear housing is comprised of:
a proximal bearing orifice in a proximal side of the shear housing and having an axis perpendicular to a plane of the attachment base,
a distal bearing orifice in a distal side of the shear housing and having an axis concentric to the proximal bearing orifice,
a positioning sleeve extended from the proximal side of the shear housing concentrically the proximal bearing orifice,
internal threads in the positioning sleeve having a minimum internal diameter selectively greater than an internal diameter of the proximal bearing orifice,
the pivot axle having proximal end external threads engagable with the internal threads in the positioning sleeve, a proximal step with an external circumferential periphery fittable snugly in an inside periphery of the proximal bearing orifice, a cylindrical bearing section extended from the proximal step, and distal end external threads having a maximum external diameter selectively less than the cylindrical bearing section,
a bearing adjustment sleeve having an external periphery fittable snugly in the distal bearing orifice, an internal periphery fittable snugly on the cylindrical bearing surface of the pivot axle, a length selectively less than a length of the pivot axle between the proximal step and the distal end of the of the pivot axle, and 1 a threaded position adjustment means in communication between the bearing adjustment sleeve and the distal end threads in the pivot axle,
a proximal bearing step in a proximal end of the pivot orifice in the pivotal cutter jaw,
a distal bearing step in a distal end of the pivot orifice in the pivotal cutter jaw,
a proximal bearing having an inside periphery fittable snugly onto the cylindrical bearing section of the pivot axle, a proximal end positional against the proximal step in the pivot axle, and a distal end positional against an axial wall of the proximal bearing step in the proximal end of the pivot orifice in the pivotal cutter jaw,
a distal bearing having an inside periphery fittable snugly onto the cylindrical bearing section of the pivot axle, a proximal end positional against an axial wall of the distal step of the pivot orifice in the pivotal cutter jaw, an outside periphery fittable snugly in the distal step of the pivot orifice in the pivotal cutter jaw, and a distal end positional against a proximal wall of the bearing adjustment sleeve,
an axle lock member positional at a proximal end of the positioning sleeve,
at least one threaded lock bolt orifice in the proximal end of the pivot axle and having an axis collinear with the axis of the pivot axle, and
at least one lock bolt orifice in the axle lock member having an axis positional concentrically with the threaded lock bolt orifice in the proximal end of the pivot axle.

15. A demolition shear according to claim 14 wherein the threaded adjustment positioning means in communication between the bearing adjustment sleeve and the distal end external threads in the pivot axle is a distal axle cap having a sleeve with internal threads engagable with the distal end external threads and a thread locking means in thread locking relationship between the distal end external threads in the pivot axle and the internal threads in the distal axle cap and further comprising:
wrench flats on a central portion of the proximal end of the pivot axle, and
wrench flat access means in access communication between a proximal side and a distal side of the axle lock member.

16. A demolition shear according to claim 14 wherein the proximal and distal bearings respectively are friction bearings having suitable bearing surfaces in combination with matching bearing surfaces on the pivot axle and on the pivotal cutter jaw.

17. A demolition shear according to claim 1 wherein the proximal and distal bearings respectively are appropriately sized tapered roller bearings.

18. A demolition shear according to claim 14 wherein the proximal and distal bearings respectively are appropriately sized spherical roller thrust bearings.

19. A demolition shear according to claim 14 wherein the proximal bearing is a different type of bearing from the distal bearing.

20. A demolition shear according to claim 14 wherein the proximal bearing is a tapered roller bearing and the distal bearing is a spherical roller thrust bearing.

21. A demolition shear according to claim 14 and further comprising:
an angular pivotal jaw support member extended between a distal thrust bearing housing on the pivotal cutter jaw and a distal end of the pivotal cutter jaw.

22. A demolition shear according to claim 1 and further comprising:
a bolt-on replaceable cutter tip having a central positioning channel extended from a top edge to a walled bottom edge aft of a front wall,
at least one bolt orifice extended from side-to-side of the cutter tip and traversing the central positioning channel,
a countersunk bolt head orifice at one end and a countersunk fastener nut orifice at an opposite end of each of the at least one bolt orifice,
a positioning ridge on a distal end of the pivotal cutter jaw snugly fittable in the central positioning channel in the bolt-on replaceable cutter tip, and
a positioning step against which a top edge of the bolt-on replaceable cutter tip is positional on the distal end of the pivotal cutter jaw.

* * * * *